United States Patent
Teutsch

[15] 3,668,952
[45] June 13, 1972

[54] AUTOMOBILE WHEEL THEFT PREVENTION DEVICE

[72] Inventor: John H. Teutsch, 29590 Hoover Road, Warren, Mich. 48093

[22] Filed: Jan. 26, 1970

[21] Appl. No.: 5,773

[52] U.S. Cl. ............................................................ 81/125
[51] Int. Cl. ....................................................... B25b 13/02
[58] Field of Search ............................. 81/90, 125, 121–122

[56] References Cited

UNITED STATES PATENTS

| 1,010,503 | 12/1911 | Langan | 81/90 |
| 3,222,976 | 12/1965 | Holman | 81/90 |
| 2,982,162 | 5/1961 | Golden | 81/90 |
| 2,805,594 | 9/1957 | Fogel | 81/125 |
| 2,709,939 | 6/1955 | Plungis et al | 81/90 |

FOREIGN PATENTS OR APPLICATIONS

| 118,763 | 4/1947 | Sweden | 81/125 |

Primary Examiner—James L. Jones, Jr.
Attorney—Whittemore, Hulbert & Belknap

[57] ABSTRACT

An automobile wheel theft prevention device consisting of an automobile lug wrench having an arcuate spring therearound, a spring biased radially movable stud therethrough and a round lug with a radial opening therein. The round lug cannot be removed by means of the usual lug wrench. To remove a wheel having the round lug thereon, the radially movable stud on the lug wrench must be engaged in the opening in the round lug. With the wrench thus locked onto the round lug, the lug may be removed in the usual manner.

12 Claims, 4 Drawing Figures

PATENTED JUN 13 1972

3,668,952

INVENTOR.
JOHN H. TEUTSCH
BY Whittemore,
Hulbert & Belknap
ATTORNEYS

AUTOMOBILE WHEEL THEFT PREVENTION DEVICE

BACKGROUND OF THE INVENTION

1. Field of the Invention

The invention relates to automobile wheel theft prevention structure and refers more specifically to a modified automobile lug wrench and a round wheel lug which can only be removed by means of the modified lug wrench.

2. Description of the Prior Art

In the past it was relatively easy to steal a wheel off of a parked car because of the fact that one lug wrench could be used to remove all of the hexagonal lugs which were secured to the car wheels. There was little variation among either the lugs or the lug wrenches. Each lug wrench was interchangeable with most other lug wrenches and could be used to remove the hexagonal lugs off of most makes and models of cars.

SUMMARY OF THE INVENTION

The invention includes theft prevention structure consisting of a specially modified lug wrench and a round lug. To prevent theft of automobile wheels, one round lug which can be removed only with the modified lug wrench is provided with each wheel of an automobile. The lug wrench has an arcuate spring therearound and a radially movable stud therethrough which is urged radially inward by the spring. The stud is provided with a conical or V-shaped top to secure the spring in a predetermined angular position on the lug wrench. The round lug has a radial opening therein. To remove the wheel having the round lug thereon, the special lug wrench having the arcuate spring therearound and including the radially movable stud therethrough is inserted over the round lug with the stud in a radially outer position. The lug wrench is then moved until the stud is forced radially inward by the spring and fits within the radial opening in the round lug. The round lug may then be removed in the usual manner since the lug wrench is now locked onto the round lug. A normal lug wrench and the particular round lug to be used therewith are machined together to provide alignment of the openings therethrough.

DESCRIPTION OF THE PREFERRED EMBODIMENTS

Figures 1, 2, 3, 4:
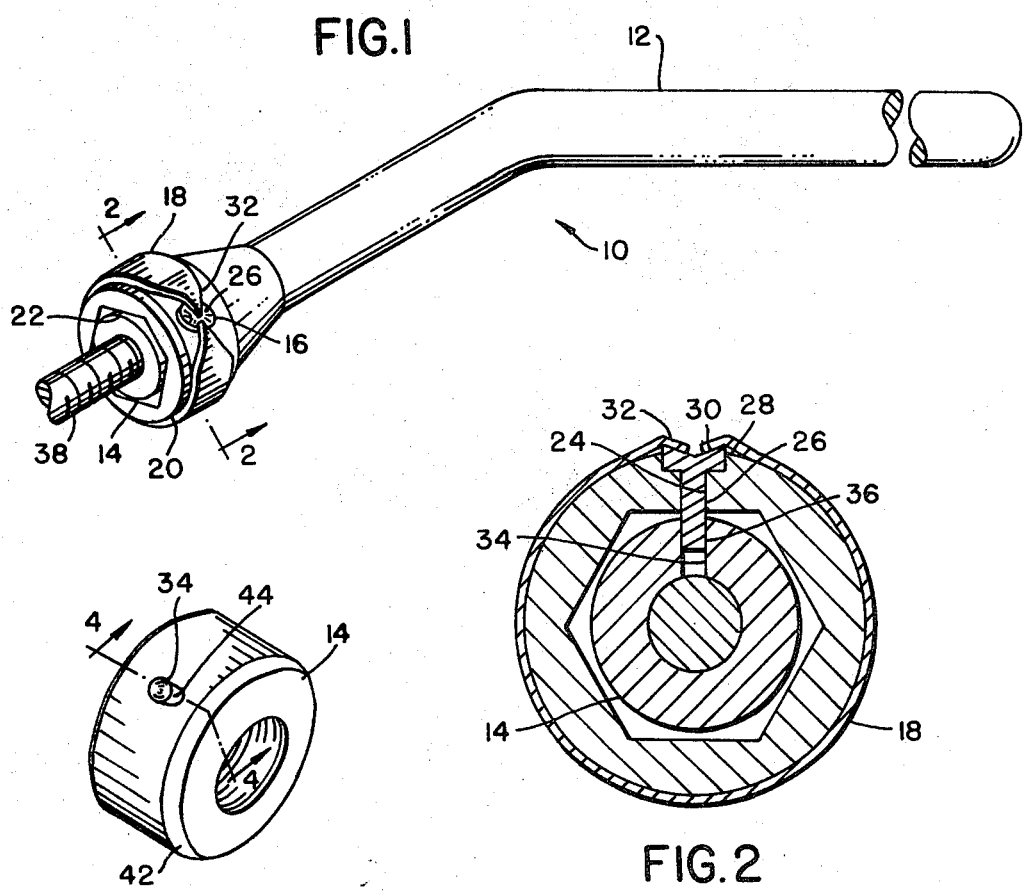
FIG. 1 is a perspective view of the automobile lug wrench of the invention in engagement with a round lug in accordance with the invention.
FIG. 2 is an enlarged cross section view of the assembled modified lug and lug wrench showing the arcuate spring around the lug wrench and the radially movable stud through the lug wrench taken substantially on the line 2—2 in FIG. 1.
FIG. 3 is an enlarged perspective view of the round lug illustrated in FIG. 1 showing the radial opening therein.
FIG. 4 is a longitudinal section view of the round lug of FIG. 3 taken substantially on line 4—4 in FIG. 3.

The wheel theft prevention structure 10 illustrated in assembly in FIG. 1 includes a lug wrench 12 and a circular lug 14. The lug wrench 12 has been modified to include a radially extending stud 16 and an arcuate spring 18.

In use the circular lug 14 can be removed only by a lug wrench 12 modified in accordance with the invention. Thus, theft of a device such as an automobile wheel secured by the round lug 14 may be substantially reduced by use of the structure 10.

The lug wrench 12 which may be any convenient type and as shown is the angled type provided with most new automobiles which includes a generally cylindrical head 20 having a hexagonal end opening 22 for receiving the usual hexagonal wheel lugs provided on most automobiles. A radially extending opening 24 best shown in FIG. 2 having different diameters is provided in the head 20 of the lug wrench 12 in accordance with the invention.

A stud 26, best shown in longitudinal cross section in FIG. 2, is positioned within the opening 24 in the head 20 of the lug wrench 12. The stud 26 includes the enlarged diameter head 28 for limiting the radial movement of the stud 26 into the opening 24 through the head of the wrench 12. A conical recess 30 is provided in the top of the head 28 of the lug 26 for receiving the end 32 of the spring 18, again as shown best in FIG. 2.

Spring 18 is generally arcuate and of slightly less than 360 degrees extent as shown in FIG. 2. The spring 18 includes the pointed ends 32 extending radially of the head 20 of the wrench 12 into the conical recess 30 in the head of the stud 26 in assembly on the wrench 12. Spring 18 thus urges the stud 26 radially inwardly in the opening 24 and is located angularly on the head 20 of the wrench 12 since it is not allowed to rotate due to the cooperation of the ends 32 thereof with the conical recess 30 in the head 28 of the stud 26.

The lug nut 14 as shown best in FIG. 3 is provided with a radially extending opening 34 therein to receive the end 36 of the stud 26. With the end 26 of the stud in the opening 34 through the cylindrical lug 14, the lug 14 may be removed from the wheel stud 38 shown in FIG. 1 in the usual manner.

The ends of the lug nut 14 are provided with an ⅛-inch, 60° chamfer 42 to permit placing the lug wrench 12 over the lug nut 14 as shown in FIGS. 3 and 4. The radially outer end of the opening 34 in the nut 14 may also be provided with a chamfer 44 to facilitate removal of the nut from the wrench as shown in FIG. 4. Alternatively, a screwdriver may be used to relieve the pressure of spring 18 on nut 14 thereby permitting outward radial movement of stud 26 in nut 14 to facilitate assembly and disassembly of the nut and wrench.

Thus, in overall operation of the theft prevention structure illustrated in FIGS. 1 through 3, should any unauthorized attempt be made to remove the round nut 14 from the stud 38, the nut 14 which may be the usual lug machined to have a cylindrical outer surface cannot be removed with the usual lug wrench. On discovering the round lug nut, the usual wheel thief will pass up the wheel secured by the round nut in favor of other wheels secured by more conventional hexagonal nuts which may be removed with the lug wrench he has. Thus, vehicle wheel loss may be substantially reduced by use of the invention.

When authorized personnel are required to remove the wheel, the spring 18 is urged radially outwardly by means of the chamfer 42 moving the stud 26 to a radially outer position as the head 20 of the lug wrench 12 is positioned over the lug 14. The wrench 12 is then rotated about the lug 14 so that stud 26 will drop into the opening 34. On further rotation of the wrench 12, the lug 14 is removed in the usual manner. Removal of the round lug 14 from the wrench 12 may be accomplished with the use of a screwdriver to relieve the tension of the spring 18 to permit radial withdrawal of the stud 26 from the lug 14 or the stud 26 may be cammed radially by means of chamfer 44.

If desired, the spring 18 and stud may be removed from the wrench 12 and stored separate from the wrench 12. Thus, even if a thief finds the wrench 12, it will be of no use to him.

While one embodiment and a modification of the invention have been considered in detail herein, it will be understood that other embodiments and modifications are contemplated by the inventor. It is the intention to include all the modifications and embodiments of the invention as are defined by the appended claims within the scope of the invention.

What I claim as my invention is:

1. A theft prevention device comprising a round lug for securing a wheel to a vehicle or the like, and a lug wrench comprising a hexagonal head and a radially movable stud extending through the hexagonal head and provided with a conical top recess, and an arcuate spring extending around the hexagonal head engaged with the stud and urging it radially inwardly, said spring including at least one end extending radially into the top recess to secure the spring in a predetermined angular position on the lug wrench.

2. Structure as set forth in claim 1 and further including a radially extending recess in the round lug.

3. Structure as set forth in claim 2 wherein the radially extending recess includes a chamfer at the outer end thereof extending axially of the lug.

4. Structure as set forth in claim 3 wherein the round lug has chamfered ends.

5. A theft prevention device comprising a round lug for securing a wheel to a vehicle or the like, and a lug wrench comprising a polygonal head, a radially movable stud extending through the polygonal head and provided with a top recess, and an arcuate spring extending around the polygonal head engaged with the stud and urging it radially inwardly, said spring including means to secure it in a predetermined angular position on the lug wrench.

6. Structure as set forth in claim 5 wherein said head is hexagonally shaped.

7. Structure as set forth in claim 5 wherein said top recess is conically shaped.

8. Structure as set forth in claim 5 wherein the means to secure said spring in a predetermined angular position on the lug wrench comprise said spring including at least one end extending radially into the top recess of the lug.

9. Structure as set forth in claim 5 wherein there is provided a radially extending recess in the round lug.

10. Structure as set forth in claim 9 wherein the radially extending recess includes a chamfer at the outer end thereof extending axially of the lug.

11. Structure as set forth in claim 10 wherein the round lug has chamfered ends.

12. A theft prevention device comprising a round lug for securing a wheel to a vehicle or the like, and a lug wrench comprising a polygonal head, a radially movable stud extending through the polygonal head, said stud including a conical top recess therein, an arcuate spring extending around the polygonal head, said spring including at least one end extending radially into said top recess of the stud to urge said stud radially inwardly and to secure the spring in a predetermined angular position on the lug wrench.

* * * * *